United States Patent [19]

Guillot

[11] Patent Number: 4,661,307
[45] Date of Patent: Apr. 28, 1987

[54] COUPLING DEVICE BETWEEN A MOTOR MEMBER AND A RECEIVER MEMBER

[75] Inventor: Jean-Francois Guillot, Aixen Provence, France

[73] Assignee: Commissariat a l'Energie Atomique, Paris, France

[21] Appl. No.: 727,744

[22] Filed: Apr. 26, 1985

[30] Foreign Application Priority Data

Apr. 27, 1984 [FR] France ................. 84 06691

[51] Int. Cl.$^4$ ............................................. G21C 7/12
[52] U.S. Cl. .................. 376/232; 376/233; 464/37; 464/66
[58] Field of Search .................. 376/232, 233; 464/37, 464/66, 81

[56] References Cited

U.S. PATENT DOCUMENTS 3,924,427 12/1975 Dehne et al. .............. 464/37 X

FOREIGN PATENT DOCUMENTS

| 708093 | 4/1965 | Canada | 376/233 |
| 0093055 | 11/1983 | European Pat. Off. | 376/232 |
| 2608304 | 9/1977 | Fed. Rep. of Germany | 464/37 |
| 2495813 | 6/1982 | France | 376/232 |
| 2029078 | 3/1980 | United Kingdom | 376/232 |

Primary Examiner—Paul A. Bell
Attorney, Agent, or Firm—Michael N. Meller

[57] ABSTRACT

A coupling device is disclosed which is in rotation between a motor member and a receiver member. The device has a ratchet ring, a pawl holder ring and a drive ring. The pawl holder ring has stops and pawls with a shoulder and a stop surface and pivots between an engaged position and a disengaged position. The drive ring has drivers engaged in the stops. A contoured cam on the drive ring bears on the pawl shoulder in order to pivot it towards its engaged position. Elastic biasing means are positioned between the driver and one of the stops. The coupling device is adapted for use in the control of control rods in a nuclear reactor.

5 Claims, 6 Drawing Figures

COUPLING DEVICE BETWEEN A MOTOR MEMBER AND A RECEIVER MEMBER

BACKGROUND OF THE INVENTION

The invention relates to a coupling member permitting the transmission of a movement without off-centering or torque loss in both directions when the receiver member is moved by the motor member and the transmission of a movement without off-centering or torque loss in a single direction when the functions of the motor and receiver members are reversed. Thus, the transmission of the movement of the receiver member to the motor member is locked after rotating the receiver member by a fraction of a turn. Unlocking can be obtained either by the movement of the motor member by the receiver member in the single operating direction, or by the control of the movement in one or the other direction by the motor member.

A large number of devices for transmitting a rotary movement between a motor member and a receiver member are known. These devices are more particularly used in the control of the control rods of nuclear reactors. French Pat. No. 78 22 253 filed on July 27th 1978 in the name of the Commissariat a l'Energie Atomique and entitled "Device for controlling a control rod of a nuclear reactor provided with safety means preventing ejection and turning over" describes a device of this type. It comprises a mechanism for controlling the translation of the control rod located in a tight enclosure integral with the reactor vessel cover, means for preventing the ejection of the control rod and finally means for controlling the anti-ejection means which are sensitive to an external influence urging the control rod out of the reactor core.

In reactors of this type, the power of the nuclear boiler is regulated by introducing control rods to a greater or lesser depth into the reactor core, having as the main characteristic a high neutron-absorbing power. The control device of these control rods must not only permit their lowering and raising, but also their rapid drop in the case of an increase in reactivity.

Water reactors are also used for the propulsion of ships. Thus, they are subject to the possibility of being turned over, which in certain circumstances can lead to the control rods being extracted from the reactor core, which can lead to damage and injury.

The control rods can also be extracted if the sealing of the enclosure containing the control rod control mechanism is broken, because this would lead to a rapid depressurization of the enclosure. This depressurization would lead to a pressure difference between the interior of the enclosure and the interior of the reactor vessel. This pressure difference would lead to a considerable pressure on the control rod and would tend to eject it from the reactor core. Thus, devices are provided for preventing the ejection of control rods from water reactors in the case of a depressurization of the enclosure containing the control rod control mechanism, or in the case of the reactor being turned over when it is on board a ship.

SUMMARY OF THE INVENTION

The coupling device between a motor member and a receiver member according to the invention is able to fulfil this function. For this application the coupling device according to the invention is placed on an internal kinematic chain between the control rod, forming the receiver member and the motor member. The translation of the control rods is obtained through a rotary movement transformed into a translatory movement, e.g. by a screw—nut device. The normal lowering and raising of the control rod are ensured by a drive motor. The torque is transmitted from the motor member to the receiver member and in this case transmission is possible in both directions.

The emergency shutdown of the reactor is ensured by the dropping of the control rods. The situation is then such that the receiver member drives the motor member under the effect of the weight of the control rods. In this operating case, the coupling device according to the invention makes it possible for each of the control rods to be rapidly dropped as a result of a freewheeling action.

In cases where the control rods would tend to be ejected from the reactor core, the coupling device would stop the rotation of the receiver member, which would prevent the ejection of the control rod.

From the outside to the inside, the coupling device according to the invention comprises a first ring, called a ratchet ring, having at least one ratchet on its outer face, a second ring, called the pawl holder ring, and a third ring, called the drive ring, the first, second and third rings being arranged concentrically, with the pawl holder ring located within the ratchet ring and the drive ring located within the pawl holder ring. The pawl holder ring has at least first and second stops and at least one pawl mounted in pivotable manner on the pawl holder ring, said pawl having a shoulder and a stop surface, it being pivoted under the action of elastic restoring means between an engaged position in which the stop surface is ratched in the ratchets of the ratchet ring and a disengaged position in which said stop surface is disengaged from the ratchets. The drive ring has at least one substantially radial driver, which is engaged between the first and second stops of the pawl holder ring. There is at least one cam contour which, following the relative angular displacement direction of the drive ring with respect to the pawl holder ring, bears on the pawl shoulder in order to pivot it towards its engaged position, or releases the shoulder which, under the action of elastic restoring means, pivots towards its engaged position in which the stop surface of the pawl engages one of the ratchets of the outer ring. Elastic arming means are arranged between the drive ring driver and one of the first and second stops, said elastic means tending to rotate the drive ring with respect to the pawl holder ring, towards the position where the cam contour releases the pawl shoulder.

The invention also relates to a nuclear reactor comprising a vessel, a core located in the vessel, at least one control rod, a mechanism for controlling the control rod in order to introduce the latter more or less deeply into the core, said mechanism being located in a fixed enclosure integral with the reactor vessel and having a nut fixed with respect to the enclosure and a screw cooperating with said nut, and a motor member for driving the control mechanism. The invention comprises a coupling device between said motor member and said screw, the coupling device comprising a first ring, called a ratchet ring and having at least one ratchet on its inner face, a second ring, called a pawl holder ring and a third ring, called the drive ring, the first, second and third rings being arranged concentrically, the pawl holder ring being located within the ratchet ring and the drive ring being located in the pawl holder ring, at least one pawl being mounted in a pivotable manner on the pawl holder ring. The pawl has a shoulder and a stop surface and is pivotable, under the action of elastic restoring means, between an engaged position in which the stop surface is ratched in the ratchets of the ratchet ring and a disengaged position in which the stop surface is disengaged from the ratchets The pawl holder ring has at least first and second stops, and the drive ring has at least one substantially radial driver engaged in the first and second stops of the pawl holder ring, and at least one cam contour which, as a function of the relative angular displacement direction of the drive ring with respect to the pawl holder ring, bears on the shoulder of the pawl in order to pivot it towards its disengaged position, or releases the shoulder which, under the action of elastic restoring means, pivots towards its engaged position in which the stop surface of the pawl engages one of the ratchets of the outer ring The invention further comprises elastic arming means positioned between the driver of the drive ring and one of said first and second stops, said elastic means tending to rotate the drive ring with respect to the pawl holder ring towards the position where the cam contour releases the pawl shoulder, the drive ring being integral with the motor member, the pawl holder ring being integral with the mechanism for controlling the control means, and the ratchet ring being mounted in fixed manner in said enclosure integral with the vessel.

The invention also relates to a device for limiting the torque transmitted between a motor member and a receiver member, comprising a first ring, called the ratchet ring and having at least one ratchet on its inner face, a second ring, called the pawl holder ring, and a third ring, called the drive ring, said first, second and third rings being arranged concentrically, the pawl holder ring being located within the ratchet ring and the drive ring being located in the pawl holder ring, at least one pawl being mounted in a pivotable manner on the pawl holder ring. The pawl has a shoulder and a stop surface and is pivotable, under the action of elastic restoring means, between an engaged position in which the stop surface is ratched in the ratchets of the ratchet ring and a disengaged position in which the stop surface is disengaged from the ratchets. The pawl holder ring has at least first and second stops, the drive ring having at least one substantially radial driver engaged in the first and second stops of the pawl holder ring, and at least one cam contour which, as a function of the relative angular displacement direction of the drive ring with respect to the pawl holder ring, bears on the shoulder of the ratchet to pivot it towards its disengaged position, or releases the shoulder which, under the action of restoring means, pivots towards its engaged position in which the stop surface of the pawl engages one of the ratchets of the external ring. The invention further comprises an elastic arming means positioned between the driver of the drive ring and one of the first and second stops, said elastic means tending to rotate the drive ring with respect to the pawl holder ring towards the position where the cam contour releases the pawl shoulder, said motor member being linked in rotation with the ratchet ring.

Finally, the invention also relates to a device for the transmission of a torque from a motor member to first and second receiver members, comprising a first ring, called the ratchet ring and having at least one ratchet on its inner face, a second ring, called the pawl holder ring, and a third ring, called the drive ring, said first, second and third rings being arranged concentrically, the pawl holder ring being located within the ratchet ring and the drive ring being located in the pawl holder ring, at least one pawl being mounted in a pivotable manner on the pawl holder ring. The pawl has a shoulder and a stop surface and is pivotable, under the action of elastic restoring means, between an engaged position in which the stop surface is ratched in the ratchets of the ratchet ring, and a disengaged position in which said stop surface is disengaged from the ratchets. The pawl holder ring has at least first and second stops, the drive ring having at least one substantially radial driver engaged between the first and second stops of a pawl holder ring, and at least one cam contour which, as a function of the relative angular displacement direction of the drive ring with respect to the pawl holder ring, bears on the shoulder of the pawl to pivot it towards its disengaged position, or releases the shoulder which, under the action of the elastic restoring means, pivots towards its engaged position in which the stop surface of the pawl engages one of the ratchets of the outer ring. The invention further comprises an elastic arming means positioned between the driver of the drive ring and one of said first and second stops, said elastic means tending to rotate the drive ring with respect to the pawl holder ring towards the position where the cam contour releases the pawl shoulder, said first receiver member being constituted by the ratchet ring and said second receiver member by the pawl holder ring.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
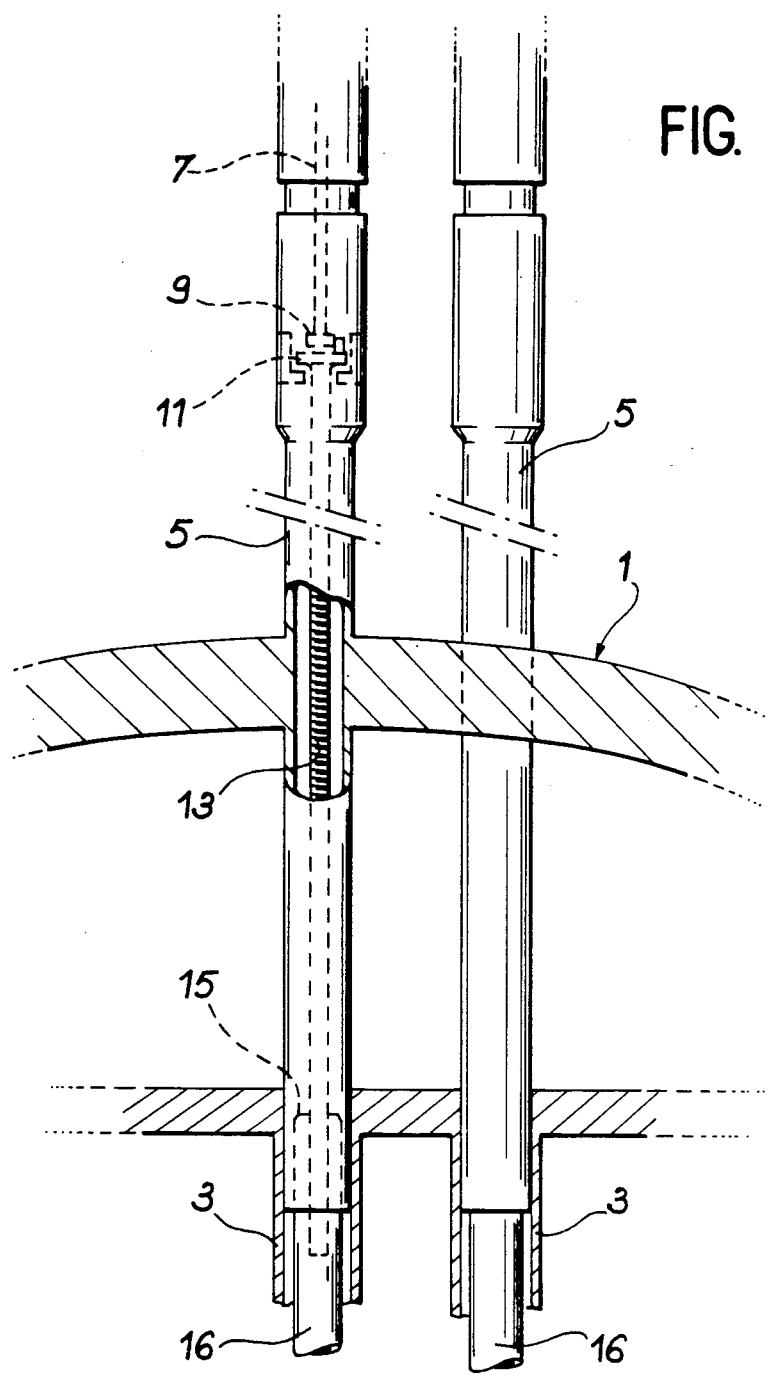
FIG. 1 is a sectional view of the upper part of a nuclear reactor vessel, equipped with a device for controlling the control rods having a coupling according to the invention.

FIG. 1 shows the upper part of the vessel 1 of a pressurized water nuclear reactor. Within the vessel is located the core (not shown) constituted by juxtaposed fuel assemblies. Above the core is provided a structure 3, through which are vertically displaced the control rods to be introduced more or less deeply in the core. Each control (not shown) rod is connected, in its upper part, to a translation control device disposed within a tight enclosure 5 joined to vessel 1. The control device comprises a motor (not shown) located in the upper part of enclosure 5. The motor drives the motor member 9 of a coupling device according to the invention via a shaft 7, shown in dotted line form in FIG. 1. The torque is transmitted from the motor member to the receiver member 11 and then from the receiver member 11 to a screw 13. The latter can be rotated in both directions. It makes it possible to control the upward and downward translation of a nut 15, which is immobilized against uncoupled. In the case where the control rods are subject to an ejection force for any reason, which tends to force them out of the reactor core, because the screw nut system 13, 15 is reversible, this force leads to a torque exerted on screw 13 and consequently on drive ring 31. Bearing in mind the slope of the pitch of screw 13, said torque is exerted in the counterclockwise direction, as viewed from above as in FIGS. 4 and 5. As stated hereinbefore, when the device according to the invention is in its initial state, i.e. in the inoperative state, the pawls 35 normally engage the ratchets of ring 21. The rotation of the pawl holder ring 35 is consequently prevented, because ring 21 is fixed and immobilized against rotation with respect to the tight enclosure 5. Thus, the torque is not transmitted to the drive ring and consequently is not transmitted to shaft 7. The ejection of the control rod from the reactor core is consequently prevented.

It is also desirable to permit the emergency shutdown of the reactor as a result of the dropping of the control rods. Under the action of their own weight, the rods drop much faster than as a result of the normal dropping mechanism controlled by the rotation of the motor. The dropping of the control rods is initiated by the uncoupling of the motor. Thus, the drive ring no longer exerts any opposing torque. The pawls 35 are in the engaged position, but they work in the release sense and consequently do not prevent the rotary movement of the pawl holder ring 31.

The coupling device according to the invention can also protect a motor element against excessive torque. For this application, the ratchet ring 21 is linked in rotation with the motor shaft. Thus, the torque is transmitted via the pawl holder ring 31 in a clockwise direction to pawls 35. The force exerted on pawls 35 is itself transmitted to the pawl holder ring via the pawl spindles 37. Under the action of this torque, a relative rotary movement of the pawl holder ring and the drive ring takes place. This relative movement tends to move the drivers 25a towards stops 31a and simultaneously to make the cam contours 29b bear on the pawl shoulders 35b. However, the arming springs 33 between stops 31a and drivers 29a oppose this relative movement by exerting an opposing torque tending to move each stop 31a away from the drivers 29a. The rigidity of the springs 33 can be chosen so as to transmit a torque of a desired magnitude. When the magnitude of the transmitted torque remains below the chosen limit value, the relative movement of the drive ring with respect to the pawl holder ring is sufficiently limited to ensure that the pawls remain in the engaged position and that the torque is transmitted. If the transmitted torque becomes excessive, i.e. exceeding the limit value as a result e.g. of the locking of the resistant or receiver member, the arming springs 33 compress more, so that the relative movement of the drive ring and the pawl holder ring continues until the cam contours 29b engage beneath the pawl shoulders 35b. This causes the disengagement of stop surfaces 35a of the pawls from the ratchets 21a and consequently the disengagement of the ratchet ring. The torque transmitted by the motor member is consequently permanently limited to the chosen limit value.

The coupling device according to the invention is also used for the transmission of a torque from a motor member to two receiver members. In this application, the motor member is linked in rotation with the drive ring 29. A first receiver is constituted by the ratchet ring 21 and a second receiver by the pawl holder ring 31.

When the motor member rotates in a clockwise direction, the drive ring 29 only drives the pawl holder ring 31 via cylindrical stops 31b. The pawls operate by release. The torque is consequently not transmitted to the ratchet ring.

When the motor member rotates in the reverse direction, i.e. counterclockwise, the drive ring 29 drives the pawl holder ring 31 via stops 31a, the motor torque being transmitted by drivers 29a to stops 31a via arming springs 33, as explained hereinbefore. The rigidity of these springs is defined so as to limit the transmitted torque. When the torque value is below the chosen value, the second receiver member constituted by ratchet ring 21 is rotated by pawls 35 engaged in ratchets 31a. When the value of the transmitted torque exceeds the chosen value, in the same way as described hereinbefore, the continuation of the relative rotary movement of the drive ring with respect to the pawl holder ring causes, by compressing the arming spring, the engagement of the cam contours 29b beneath the pawl shoulders 35b and consequently brings the pawls into the disengaged position, so that the second receiver member is disengaged. Thus, in this application, one of the receiver members, namely the pawl holder ring, has priority. In the clockwise rotation direction, only this priority receiver member is driven. In the counterclockwise rotation direction, it is still driven, while the second receiver member, i.e. the ratchet wheel, is only driven for a torque below a given limit value.

What is claimed is:

1. A coupling device in rotation between a motor member and at least one receiver member, comprising a first ring, called the ratchet ring and having at least one ratchet on its inner face, a second ring, called the pawl holder ring, and a third ring, called the drive ring, the first, second and third rings being arranged concentrically, the pawl holder ring being located within the ratchet ring and the drive ring being located in the pawl holder ring, at least one pawl being mounted in a pivotable manner on the pawl holder ring, said pawl having a shoulder and a stop surface and being pivotable, under the action of elastic restoring means, between an engaged position in which the stop surface is ratched in the ratchets of the ratchet ring and a disengaged position in which said stop surface is disengaged from the ratchets, wherein the pawl holder ring has at least first and second stops, the drive ring having at least one substantially radial driver arranged between said first and second stops of the pawl holder ring, and at least one cam contour which, in the relative angular displacement direction of the drive ring with respect to the pawl holder ring, bears on the pawl shoulder in order to pivot the pawl towards its engaged position, or releases the shoulder, under the action of the elastic restoring means, in order to pivot said pawl towards its engaged position in which the stop surface of the pawl engages one of the ratchets of the ratchet ring, and further comprising elastic arming means position between said driver of the drive ring and one of said first and second stops, said elastic means tending to rotate the drive ring with respect to the pawl holder ring towards the position where the cam contour releases the pawl shoulder.

2. A device according to claim 1, further comprising a maintaining ring arranged parallel to the pawl holder ring and which serves to maintain the pawls in place.

rotation. The actual control rods are integral with a bar 16 fixed to nut 15.

The coupling device 9, 11 according to the invention and shown diagrammatically in FIG. 1 must fulfil several functions. It has to allow the lowering and raising of the control rods during the normal operation of the reactor. As stated hereinbefore, it must also permit the dropping of the control rods into the reactor core to permit its emergency shutdown. Finally, when the control rods are in the core, the device must ensure that the control rods are locked in position so as to prevent the elastic forces exerted thereon from ejecting them. The coupling device according to the invention and shown in greater detail in FIGS. 2 to 5 is able to perform all these functions.

Figure 2:
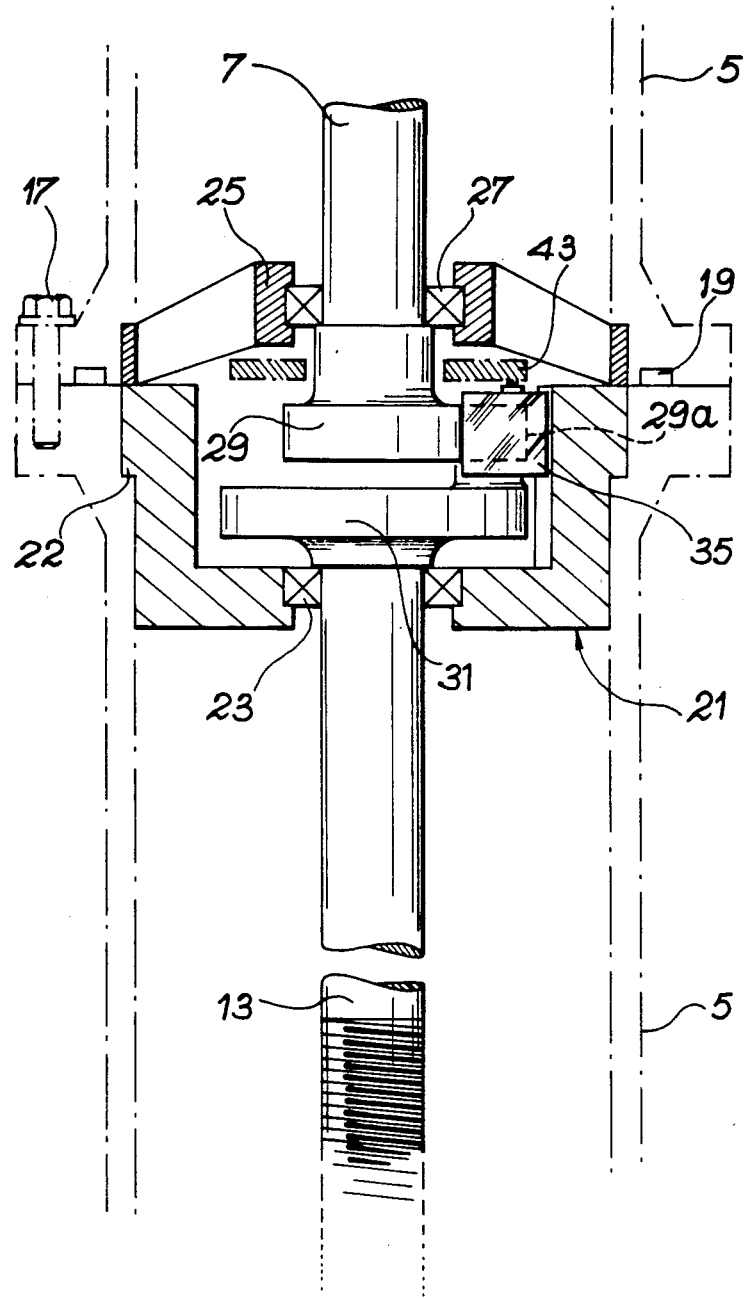
FIG. 2 is a sectional view on a larger scale of the coupling mechanism of FIG. 1.

FIG. 2 shows in mixed line form the walls 5 of the tight enclosure containing the control mechanism of a control rod. The tight enclosure is constructed in the form of two parts, connected by fixing flanges assembled by locking screws 17. A gasket 19 is positioned between the two flanges.

The ratchet ring 21 is placed in the inner bore of the lower part of enclosure 5 and is held therein by a shoulder member 22. A bearing 23 mounted in said ring ensures the rotation guidance of the control screw of the screw—nut mechanism 13, 15. Above the ratchet ring 21 is provided an end plate 25 having a guide bearing 27 for shaft 7, which is rigidly connected to the motor member 29.

Figure 3:
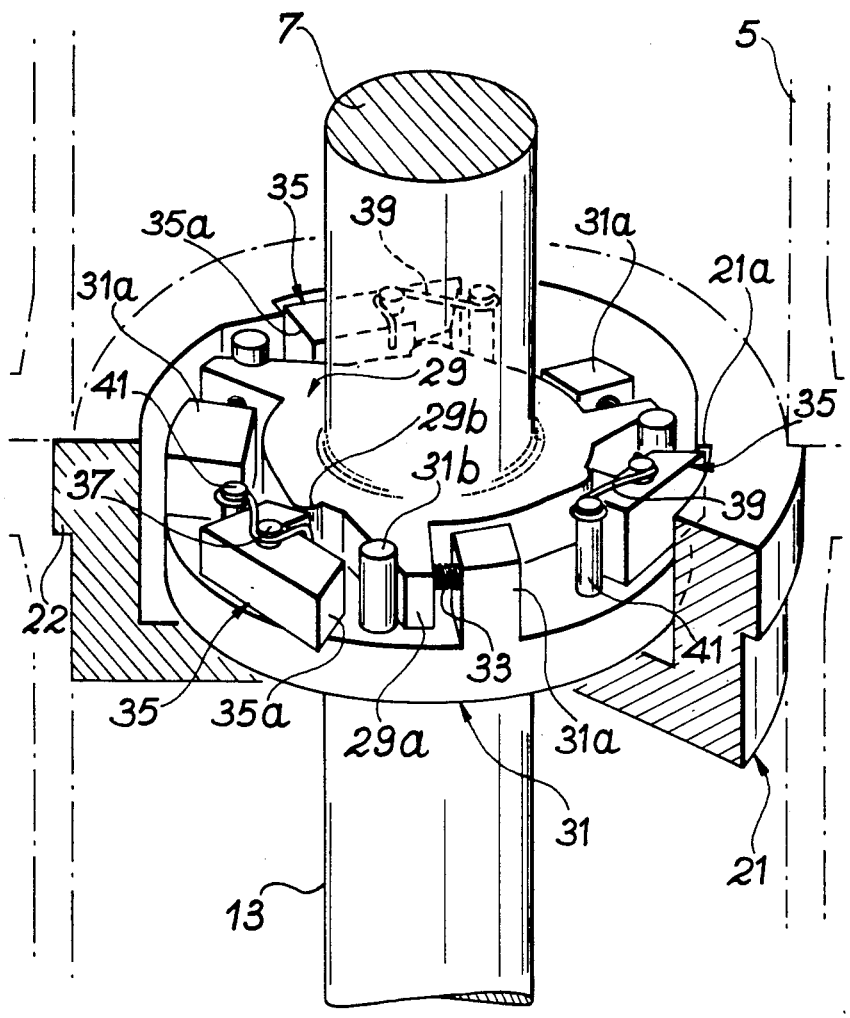
FIG. 3 is a perspective view of the coupling mechanism of FIGS. 1 and 2.
Figure 4:
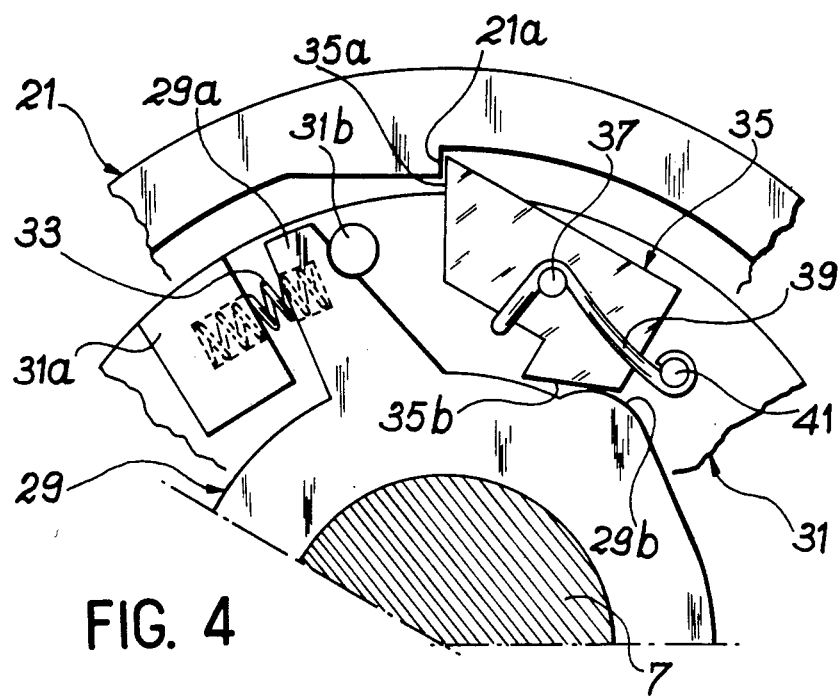
FIGS. 4 and 5 are detailed views illustrating the operation of the device according to the invention.
Figure 5:
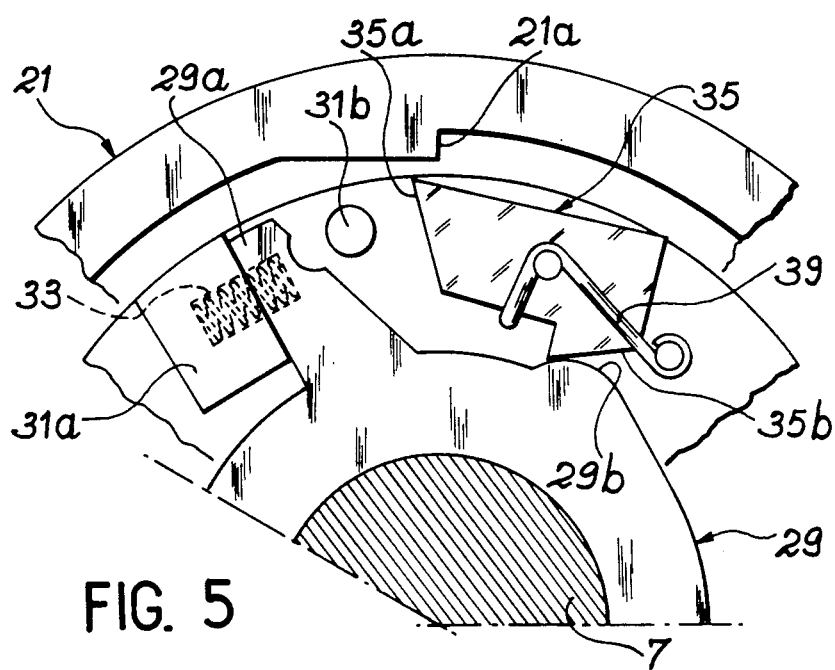

As can be seen in FIGS. 3 to 5, the ratchet ring 21 has ratchets 21a formed on the inner bore of the ring. The drive ring 29, located at the end of shaft 7, has a plurality of drivers 29a, e.g. three in the embodiment shown in FIG. 3. These drivers are substantially radially positioned. Each drive has a first radially directed face and a second face which is inclined with respect to a radial direction. Ring 29 also has cam contours 29b, their number being equal to that of the drivers 29a.

The pawl holder ring 31 has stops 31a, 31b on its upper face. In the represented embodiment, there are three pairs of stops. Stop 31a has a prismatic shape, whereas stops 31b are in the form of pins or studs with a circular section. A depression corresponding to a sectional shape of the stops 31b can be provided in drivers 29a, in order to distribute the pressure from the stop onto the driver when a force is exerted. The number of drivers 29a equals the number of pairs of stops 31a, 31b and the drivers are positioned between the two stops of a pair. Each driver has a cylindrical bore and each prismatic stop 31a has an identical bore facing it in order to receive an arming spring 33 whose function is to urge the driver 29a away from stop 31a.

Ring 31 also carries pawls 35 and the number of pawls equals the number of drivers 29a, i.e. three in the represented embodiment. The pawls 35 are located between the pairs of stops 31, 31b and substantially at mid-distance, but this is not obligatory. Pawls 35 are mounted in a pivotable manner on ring 31 by means of a spindle 37.

Figure 6:
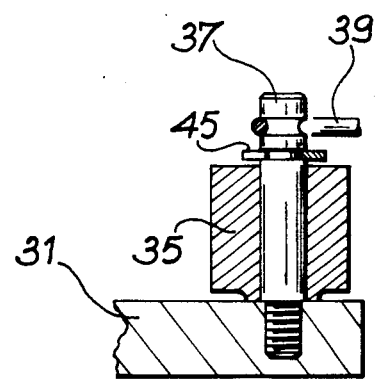
FIG. 6 is a detailed view showing the fixing of the pawls.

As shown in the detailed view of FIG. 6, spindle 37 has a stop means, such as a circlip 45.

Each pawl has a front part or stop surface 35a, which is able to engage the ratchets 21a of ratchet wheel 21, as well as a shoulder 35b. The front part 35a and shoulder 35b are located on either side of spindle 37. Each pawl 35 pivots between a first position in which the front or stop surface 35a engages a ratchet 21a of ratchet 21 (position shown in FIG. 4) and a second position in which the stop surface 35a is disengaged from the ratchets 21a of ratchet wheel 21, the latter position being shown in FIG. 5. This pivoting of pawl 35 takes place under the action of elastic restoring means 39 and the cam contour 29b of drive ring 29. When the cam contour 29b comes into contact with shoulder 35b of the pawl under the effect of a relative rotary movement between the drive ring 29 and the pawl holder ring 31, cam contour 29b raises the shoulder 35b and pivots the pawl 35 in the counterclockwise direction. This leads to the disengaged position shown in FIG. 5. The elastic restoring means 39 urges the pawl towards its engaged position. In the represented embodiment, this means is constituted by a spring, one end of which is supported on a stud 41 fixed to the pawl holder ring and the other end of which is supported on the actual pawl after bending around the pawl spindle 37.

According to a constructional variant, a supplementary ring 43 (shown in mixed line form in FIG. 2) is provided which has the function of securing the pawls 35. This ring is positioned in a plane parallel to that of the pawl holder ring 31 and is fixed to the latter by fastenings provided on stops 31a, 31b of the pawl holder ring.

The device functions in the following way. In a first operating case, the torque is transmitted by shaft 7 and by drive ring 29, said torque being transmitted in both rotation directions. In its rest position, i.e. with no transmitted torque, the device is located in the initial position shown in FIG. 3. The arming springs 33 maintain the drivers 29a against the cylindrical stops 31b. The cam contours 29b of the drive ring 29 do not bear on the shoulders of the pawls. Thus, the pawls are in the engaged position, i.e. in the position for which the stop surfaces 35a are in contact with the ratchets 21a of ring 21 (position shown in FIGS. 3 and 4).

When a torque is transmitted by the motor shaft 7 and drive ring 29, the arming springs 33 are compressed. During this compression, there is an angular displacement of drive ring 29 relative to the pawl holder ring 21. The resistance of the opposing torque of the receiver shaft makes it possible to retain this relative position between the drive and pawl holder rings. This relative movement has the effect of bringing the cam contours 29b into contact with the shoulders 35b of the pawls 35 and disengaging the stop surfaces 35a from the ratchets 21. As the pawls are in the disengaged position, the torque is transmitted to the pawl holder ring and then to the receiver shaft, driving screw 13, which controls the screw—nut system, and ensuring the translation of the control rod.

In the opposite rotation direction, i.e. in the clockwise direction, starting from the initial state defined hereinbefore, the drivers 29a remain in contact with the cylindrical stops 31b. The cam contours 29b do not bear on the shoulders 35b of pawls 35, which are consequently, under the action of restoring springs 39, in their engaged position, but work in the release direction. Thus, the pawls do not prevent the rotation of ring 31 and screw 13. The translation control of the absorbing control rod consequently is also ensured for this rotation direction.

In a second operating case, the functions of the motor and receiver shaft are reversed. In other words, the receiver member drives the motor member, i.e. in the present embodiment, screw 13 via the pawl holder ring 31 exerts a motor torque, whereas the shaft 7 integral with the drive ring 29 exerts an opposing torque or is 3. A nuclear reactor comprising a vessel, a core located in the vessel, at least one control rod, a mechanism for controlling the control rod in order to introduce the control rod into the core, said mechanism being located in a fixed enclosure integral with the reactor vessel and having a nut fixed with respect to the enclosure and a screw cooperating with said nut, a motor member for driving the control mechanism, and a coupling device arranged between said motor member and said screw, said coupling device comprising a first ring, called a ratchet ring and having at least one ratchet on its inner face, a second ring, called a pawl holder ring, and a third ring, called the drive ring, the first, second and third rings being arranged concentrically, the pawl holder ring being located within the ratchet ring and the drive ring being located in the pawl holder ring, at least one pawl being mounted in a pivotable manner on the pawl holder ring, said pawl having a shoulder and a stop surface, and being pivotable, under the action of elastic restoring means, between an engaged position in which the stop surface is ratched in the ratchets of the ratchet ring and a disengaged position in which the stop surface is disengaged from the ratchets, the pawl holder ring having at least first and second stops, said drive ring having at least one substantially radial driver arranged between the first and second stops of the pawl holder ring, and at least one cam contour which, as a function of the relative angular displacement direction of the drive ring with respect to the pawl holder ring, bears on the shoulder of the pawl in order to pivot the pawl towards its disengaged position, or releases the shoulder, under the action of elastic restoring means, in order to pivot said pawl towards its engaged position in which the stop surface of the pawl engages one of the ratchets of the ratchet ring, and further comprising elastic arming means positioned between said driver of the drive ring and one of said first and second stops, said elastic means tending to rotate the drive ring with respect to the pawl holder ring towards the position where the cam contour releases the pawl shoulder, the drive ring being integral with the motor member, the pawl holder ring being integral with the mechanism for controlling the control rod, and the ratchet ring being mounted in fixed manner in said enclosure which is integral with the vessel.

4. A device for limiting the torque transmitted between a motor member and a receiver member, comprising a first ring, called the ratchet ring and having at least one ratchet on its inner face, a second ring, called the pawl holder ring, and a third ring, called the drive ring, said first, second and third rings being arranged concentrically, the pawl holder ring being located within the ratchet ring and the drive ring being located in the pawl holder ring, at least one pawl being mounted in a pivotable manner on the pawl holder ring, said pawl having a shoulder and a stop surface and being pivotable, under the action of elastic restoring means, between an engaged position in which the stop surface is ratched in the ratchets of the ratchet ring and a disengaged position in which the stop surface is disengaged from the ratchets, wherein the pawl holder ring has at least first and second stops, the drive ring having at least one substantially radial driver arranged between the first and second stops of the pawl holder ring, and at least one cam contour which, as a function of the relative angular displacement direction of the drive ring with respect to the pawl holder ring, bears on the shoulder of the pawl to pivot the pawl towards its disengaged position, or releases the shoulder which, under the action of restoring means, in order to pivot said pawl towards its engaged position in which the stop surface of the pawl engages one of the ratchets of the ratchet ring, and further comprising elastic arming means positioned between the driver of the drive ring and one of the first and second stops, said elastic means tending to rotate the drive ring with respect to the pawl holder ring towards the position where the cam contour releases the pawl shoulder, said motor member being linked in rotation with the ratchet ring.

5. A device for the transmission of a torque from a motor member to first and second receiver members, comprising a first ring, called the ratchet ring and having at least one ratchet on its inner face, a second ring, called the pawl holder ring, and a third ring, called the drive ring, said first, second and third rings being arranged concentrically, the pawl holder ring being located within the ratchet ring and the drive ring being located in the pawl holder ring, at least one pawl being mounted in a pivotable manner on the pawl holder ring, said pawl having a shoulder and a stop surface and being pivotable, under the action of elastic restoring means, between an engaged position in which the stop surface is ratched in the ratchets of the ratchet ring, and a disengaged position in which said stop surface is disengaged from the ratchets, wherein the pawl holder ring has at least first and second stops, the drive ring having at least one substantially radial driver arranged between the first and second stops of a pawl holder ring, and at least one cam contour which, as a function of the relative angular displacement direction of the drive ring with respect to the pawl holder ring, bears on the shoulder of the pawl to pivot it towards its disengaged position, or releases the shoulder, under the action of the elastic restoring means, in order to pivot the pawl towards its engaged position in whichthe stop surface of the pawl engages one of the ratchets of the ratchet ring, and further comprising elastic arming means positioned between the driver of the drive ring and one of said first and second stops, said elastic means tending to rotate the drive ring with respect to the pawl holder ring towards the position where the cam contour releases the pawl shoulder, said first receiver member being constituted by the ratchet ring and said second receiver member by the pawl holder ring.

* * * * *